United States Patent
Brita et al.

(10) Patent No.: US 10,351,641 B2
(45) Date of Patent: Jul. 16, 2019

(54) PRE-POLYMERIZED CATALYST COMPONENTS FOR THE POLYMERIZATION OF OLEFINS

(71) Applicant: BASELL POLIOLEFINE ITALIA S.R.L., Milan (IT)

(72) Inventors: Diego Brita, Ferrara (IT); Gianni Collina, Ferrara (IT); Giampiero Morini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 198 days.

(21) Appl. No.: 14/899,296

(22) PCT Filed: Jun. 10, 2014

(86) PCT No.: PCT/EP2014/061958
§ 371 (c)(1),
(2) Date: Dec. 17, 2015

(87) PCT Pub. No.: WO2014/202420
PCT Pub. Date: Dec. 24, 2014

(65) Prior Publication Data
US 2016/0137759 A1    May 19, 2016

(30) Foreign Application Priority Data
Jun. 18, 2013 (EP) .................................... 13172377

(51) Int. Cl.
*C08F 4/64* (2006.01)
*C08F 10/02* (2006.01)
*C08F 110/06* (2006.01)

(52) U.S. Cl.
CPC ............ *C08F 10/02* (2013.01); *C08F 110/06* (2013.01)

(58) Field of Classification Search
CPC ................................ C08F 4/649; C08F 4/654
USPC .......................................... 502/126; 526/352
See application file for complete search history.

(56) References Cited

U.S. PATENT DOCUMENTS

| | | | | |
|---|---|---|---|---|
| 4,767,735 A | * | 8/1988 | Ewen .................... | B01J 19/1837 502/108 |
| 6,716,940 B1 | * | 4/2004 | Dall'Occo .............. | C08F 10/00 502/103 |
| 7,022,640 B2 | * | 4/2006 | Morini .................... | C07C 41/16 502/150 |
| 7,223,711 B2 | * | 5/2007 | Sacchetti .............. | C08F 4/6492 502/103 |
| 9,593,178 B2 | * | 3/2017 | Brita ....................... | C08F 10/00 |
| 2004/0116631 A1 | * | 6/2004 | Sacchetti .............. | C08F 210/16 526/125.3 |
| 2004/0235645 A1 | * | 11/2004 | Morini .................... | C07C 41/16 502/103 |
| 2010/0168341 A1 | | 7/2010 | Fujiwara | |
| 2010/0168350 A1 | * | 7/2010 | Brita ....................... | C08F 4/651 526/123.1 |
| 2014/0378631 A1 | * | 12/2014 | Brita ....................... | C08F 10/00 526/125.3 |

FOREIGN PATENT DOCUMENTS

| | | |
|---|---|---|
| CN | 87107158 A | 8/1988 |
| CN | 101389663 A | 3/2009 |
| EP | 0279153 A2 | 8/1988 |
| JP | H04168109 A | 6/1992 |
| JP | H04218509 A | 8/1992 |
| JP | H0920803 A | 1/1997 |
| JP | 2004182981 A | 7/2004 |
| RU | 2312111 C1 | 12/2007 |
| WO | WO-9845368 A1 | 10/1998 |
| WO | WO-2006040240 A1 | 4/2006 |

OTHER PUBLICATIONS

PCT International Search Report & Written Opinion dated Aug. 29, 2014 for PCT/EP2014/061958.

* cited by examiner

*Primary Examiner* — Rip A Lee

(57) ABSTRACT

The present technology relates to a pre-polymerized catalyst component for the polymerization of olefins, characterized by a non-stereospecific solid catalyst component comprising Ti, Mg and a halogen and an amount of a (co)polymer of an alpha-olefin $CH_2=CHR^1$, where $R^1$ is a $C_1$-$C_{12}$ hydrocarbon group ranging from 0.1 to 500 g per g of said solid catalyst component. In some embodiments, the (co)polymer is characterized by an isotacticity, expressed in terms isotactic pentads, of higher than 60 molar % and an intrinsic viscosity, measured in tetraline at 135° C., of at least 1.0 dL/g.

7 Claims, No Drawings

PRE-POLYMERIZED CATALYST COMPONENTS FOR THE POLYMERIZATION OF OLEFINS

This application is the U.S. National Phase of PCT International Application PCT/EP2014/061958, filed Jun. 10, 2014, claiming benefit of priority to European Patent Application No. 13172377.7, filed Jun. 18, 2013, the contents of which are incorporated herein by reference in its entirety.

FIELD OF THE INVENTION

The present disclosure relates to catalyst components for the preparation of ethylene (co)polymers by using gas-phase, slurry or bulk (co)polymerization processes.

BACKGROUND OF THE INVENTION

High-yield catalyst components for the polymerization of olefins such as ethylene can be obtained by supporting, on a magnesium dihalide, a titanium compound such as titanium halides, alkoxides and haloalcoholates. The catalyst components may be combined with an aluminum alkyl compound for the polymerization of ethylene. These catalyst components, and the catalysts obtained therefrom, are largely used in the plants for the (co)polymerization of ethylene both operating in liquid phase (slurry or bulk) and in gas-phase. However, the use of the catalyst components can be challenging due to the high reactivity of ethylene, which causes the kinetics of the polymerization reaction to be very high. As a consequence, the catalyst may be subject to tensile forces during the initial stage of polymerization which can cause the uncontrolled breakage of the catalyst, the resulting formation of fine polymer particles and the subsequent low bulk density of the polymer and operating process difficulties.

In the attempt to solve these problems, the catalyst may be pre-polymerized under controlled conditions to obtain pre-polymerized catalysts having good morphology. The catalyst may therefore increase its resistance during pre-polymerization such that the tendency to break under polymerization conditions is decreased. The formation of fine particles is therefore reduced and the overall bulk density improved. The catalysts may be prepolymerized with one olefin, which can be the same olefin, and then polymerized in the main polymerization step. Accordingly, the non-stereospecific catalysts used for ethylene polymerization can be pre-polymerized with ethylene. However, pre-polymerization with ethylene of a non-stereospecific catalyst to be used in ethylene polymerization can be problematic. For instance, the morphological properties and resistance of the catalyst may be improved only in combination with a decrease of the catalyst polymerization activity as described in U.S. Pat. No. 4,325,837. The activity and the morphological properties of the polymer produced with the pre-polymerized catalyst are in certain cases lower than that of the non-pre-polymerized one.

WO 01/85803 describes that pre-polymerization of a non-stereospecific catalyst with prochiral monomers it would be possible to obtain a catalyst for the polymerization of olefins capable to produce polymers with high bulk density and that has an activity which is higher than that of the original non pre-polymerized catalyst. The prepolymerization is carried out at room temperature, in the presence of an aluminum alkyl compound and monomer (propylene) so as to obtain low polymerization conversion. However, the resulting prepolymerized catalyst may need to be improved in terms of morphological stability when subject to ethylene polymerization carried out under drastic conditions. Moreover, the prepolymerized catalyst particles may show a slow settling velocity which decreases catalytic productivity.

The applicant has now found that when the pre-polymer of a prepolymerized catalyst shows specific features in terms of stereoregularity and molecular weight, the prepolymerized catalyst may be endowed with high settling velocity and morphological stability together with high activity. The catalyst may further generate high polymer yield polymers with regular morphology under drastic ethylene polymerization conditions.

SUMMARY OF THE INVENTION

In some embodiments, the present disclosure relates to a pre-polymerized catalyst component for the polymerization of olefins comprising a non-stereospecific solid catalyst component, Ti, Mg and a halogen and an amount of a (co)polymer of an alpha-olefin $CH_2=CHR^1$, wherein $R^1$ is a $C_1$-$C_{12}$ hydrocarbon group, ranging from 0.1 to 500 grams (g) per g of solid catalyst component. In certain embodiments, the (co)polymer is characterized by an isotacticity of higher than 60% molar expressed in terms of isotactic pentads and by an intrinsic viscosity, measured in tetraline at 135° C., of at least 1.0 dL/g.

In some embodiments, the isotacticity ranges from 60 to 95%, including 65% to 90%, 65 to 85% and 70-85%. In another embodiment, the intrinsic viscosity is equal to or higher than 1.3, such as equal to or higher than 1.5 and 1.5-2.5 dL/g. In a particular embodiment, the intrinsic viscosity is in the range of 1.0 to 1.5 and the isotacticity is higher than 70%. In further embodiments, the isotacticity is higher than 70% and the intrinsic viscosity is in the range of 1.5-2.5 dL/g.

DETAILED DESCRIPTION OF THE INVENTION

Throughout the present disclosure the term "non-stereo-specific solid catalyst component" means a solid catalyst component that gives, under the standard polymerization conditions described in the experimental section, a propylene homopolymer having an insolubility in xylene at 25° C. of lower than 60%, including lower than 55% and lower than 50%.

In some embodiments, the alpha-olefin is selected from those of $CH_2=CHR^1$, wherein $R^1$ is a $C_1$-$C_6$ linear alkyl group such as propylene, butene-1, hexene-1 and octene-1. In some embodiments, the amount of alpha-olefin (co) polymer is less than 100 g, including less than 50 g, less than 10 g and from 0.5 to 5 g per g of solid catalyst component.

The prepolymerized catalyst component has, in certain embodiments, a mercury porosity due to pores up to 1 μm ranging from 0.1 to 0.4 cm$^3$/g.

In further embodiments, the non-stereospecific solid catalyst component comprises a titanium compound and a magnesium dihalide. The magnesium halides, such as $MgCl_2$, in active form used as a support for Ziegler-Natta catalysts, are described, for instance, in U.S. Pat. Nos. 4,298,718 and 4,495,338.

The titanium compounds used in the non-stereospecific solid catalyst component of the present technology include those of the general formula $Ti(OR^{II})_{n-y}X_y$, where $R^{II}$ is a $C_1$-$C_{20}$ hydrocarbon group X is halogen, n is the valence of titanium and y is a number between 1 and n. These compounds include $TiCl_4$, $TiCl_3$ and Ti-tetraalcoholates or Ti-chloroalcoholates of formula $Ti(OR^{III})_aCl_{n-a}$ where n is the valence of titanium, a is a number comprised between 1 and n, and $R^{III}$ is a $C_1$-$C_8$ alkyl or aryl group. In some embodiments, $R^{III}$ is selected from ethyl, propyl, n-butyl, isobutyl, 2-ethylhexyl, n-octyl and phenyl.

The titanium compound can be pre-formed, or it is produced in-situ by the reaction of a titanium tetrahalide, in particular $TiCl_4$, with alcohols $R^{II}OH$ or with titanium alkoxides having the formula $Ti(OR^{II})_4$ where $R^{II}$ has the meaning defined above.

In some embodiments, more than 50%, more than 70% and more than 90% of the titanium atoms of the catalyst component are in the $4^+$ valence state.

The non-stereospecific solid catalyst components may comprise an electron donor compound (internal donor) selected from ethers, esters, amines and ketones. However, the solid catalyst component is non-stereospecific therefore, if present, the electron donor compound should either not have stereoregulating ability or be present in such an amount that it does not provide sufficient stereoregulating ability to the catalyst. The electron donors for use in the present technology may be present in a wide range of amounts, including a molar ratio of electron donor to Ti lower than 10, lower than 7 and lower than 5. Electron donor compounds having stereoregulating ability or belonging to formula (I) below, may be present in amount such as to give ED/Ti ratios lower than 0.5, lower than 0.3 and lower than 0.1.

Electron donor compounds for use in the present technology may be selected from esters of aliphatic or aromatic carboxylic acids such as phthalates, acetates, ethylacetate, benzoates and alkoxybenzenes as described, for example, in WO2011/015553, cyclic alkyl ethers such as tetrahydrofurane and electron donor compounds of formula (I) below:

$$RR_1C(OR_4)—CR_2R_3(OR_5) \quad (I)$$

where R, $R_1$, $R_2$ and $R_3$ are, independently, hydrogen or $C_1$-$C_{20}$ hydrocarbon groups which can also be condensed to form a cycle, $R_4$ and $R_5$ are $C_1$-$C_{20}$ alkyl groups, or $R_6CO$— groups where $R_6$ is a $C_1$-$C_{20}$ alkyl or aryl group, or can be joined with R and $R_3$ respectively to form a cycle; said R to $R_6$ groups possibly containing heteroatoms selected from O, Si, halogens, S, N and P.

In certain embodiments, when R and $R_4$ form a cycle, $R_5$ is a $C_1$-$C_{20}$ alkyl group. In additional embodiments, in the electron donor compound of formula (I), R, $R_4$ and $R_5$ are methyl. In further embodiments, in the electron donor compound of formula (I), $R_1$ to $R_3$ are hydrogen. When $R_4$ and $R_5$ are linear, branched or cyclic alkyl groups may be chosen among $C_1$-$C_5$ alkyl groups including methyl or ethyl groups including where both groups are methyl. In still further embodiments, the $R_6CO$ groups may be acetyl and benzyl. Specific electron donor compounds of formula (I) may be ethylene glycol diacetate, 1,2-dimethoxypropane, 1,2-diethoxypropane, 1,2-diethoxyethane, methyl tetrahydrofurfuryl ether and 1,2-dimethoxypropane. As mentioned above, such donors either do not have stereoregulating ability or are used in such an amount that they do not provide sufficient stereoregulating ability.

In addition to the above mentioned characteristics, the non-stereospecific solid catalyst component (a) may show a porosity $P_F$ determined with the mercury method ranging from 0.2 to 0.80 cm³/g, such as from 0.3 to 0.70 cm³/g and 0.35-0.60 cm³/g.

In certain embodiments, the surface area measured by the BET method is lower than 80, such as between 10 and 70 m²/g. The porosity measured by the BET method is, in some embodiments, between 0.10 and 0.50, including from 0.10 to 0.40 cm³/g.

In some embodiments, the particles of solid component have spherical morphology and average diameters between 5 and 150 μm, including from 20 to 100 μm and from 30 to 80 μm. Particles having spherical morphology include those where the ratio between the greater axis and the smaller axis is equal to or lower than 1.5, including lower than 1.3.

A method for the preparation of spherical components mentioned above may comprise a step (a) in which a compound $MgCl_2 \cdot mR^{III}OH$, where $0.3 \leq m \leq 1.7$ and $R^{III}$ is an alkyl, cycloalkyl or aryl radical having 1-12 carbon atoms, is reacted with the titanium compound of the formula $Ti(OR^I)_nX_{4-n}$ as previously defined.

In this case, $MgCl_2 \cdot mR^{III}OH$ is a precursor of Mg dihalide. These kind of compounds may be obtained by mixing alcohol and magnesium chloride in the presence of an inert hydrocarbon immiscible with the adduct, operating under stirring conditions at the melting temperature of the adduct (100-130° C.). The resulting emulsion may be quenched, thereby causing the solidification of the adduct in form of spherical particles. Representative methods for the preparation of these spherical adducts are reported in U.S. Pat. Nos. 4,469,648 and 4,399,054, and WO 98/44009. Another useable method for the spherulization is the spray cooling described for example in U.S. Pat. Nos. 5,100,849 and 4,829,034. Adducts having the desired final alcohol content can be obtained by directly using the selected amount of alcohol directly during the adduct preparation. However, if adducts with increased porosity are to be obtained it may be beneficial to first prepare adducts with more than 1.7 moles of alcohol per mole of $MgCl_2$ and then subject the resulting adducts to thermal and/or chemical dealcoholation process(es). A thermal dealcoholation process may be carried out in a nitrogen flow at temperatures between 50 and 150° C. until the alcohol content is reduced to the value ranging from 0.3 to 1.7 as described in EP 395083. The dealcoholated adducts may be characterized by a porosity (measured by mercury method) due to pores with radius due to pores with radius up to 0.1 μm ranging from 0.15 to 2.5 cm³/g, such as from 0.25 to 1.5 cm³/g.

In the reaction of step (a) the molar ratio Ti/Mg may be stoichiometric or higher, including higher than 3. In some embodiments, a large excess of titanium compound is used. Titanium compounds may include titanium tetrahalides such as $TiCl_4$. The reaction with the Ti compound can be carried out by suspending the adduct in cold $TiCl_4$ (around 0° C.); the mixture is heated up to 80-140° C. and kept at this temperature for 0.5-8 hours, such as from 0.5 to 3 hours. The excess of titanium compound can be separated at high temperatures by filtration or sedimentation and siphoning. The step (a) can be repeated twice or more. In cases of catalysts containing an electron donor compound, the electron donor compound can be added together with the titanium compound in the reaction system for reaction with the $MgCl_2 \cdot mR^{III}OH$ adduct. However, it can also be first contacted with the adduct alone and the resulting product reacted with the titanium compound. As an alternative method, the electron donor compound can be added separately in a step after the completion of the reaction between the adduct and the titanium compound.

The pre-polymerized catalyst component of the present disclosure can be obtained by pre-polymerizing the non-stereospecific solid catalyst component with the alpha olefin $CH_2=CHR^1$. In some embodiments, the prepolymer of the present technology can be obtained by contacting the olefin, the non-stereospecific solid catalyst component, an aluminum alkyl (B) as a co-catalyst and an external electron donor compound (C) in such an amount to have a molar ratio (B)/(C) of lower than 100.

The electron donor compound (C) may be used in such an amount that the molar ratio (B)/(C) ranges from 0.1 to 50, including from 1 to 20 and from 1 to 10. The alkyl-Al compound (B) may be chosen among the trialkyl aluminum compounds such as triethylaluminum, triisobutylaluminum, tri-n-butylaluminum, tri-n-hexylaluminum, tri-n-octylaluminum. It is also possible to use mixtures of trialkylaluminums with alkylaluminum halides, alkylaluminum hydrides and/or alkylaluminum sesquichlorides such as $AlEt_2Cl$ and $Al_2Et_3Cl_3$. In some embodiments, the pre-polymerization may be performed using low amounts of an alkyl-Al compound. For instance, an Al/Ti molar ratio from 0.01 to 50, including from 0.01 to 10 and from 0.05 to 3, may be used. The external electron donor compound can be selected from alcohol, glycols, esters, ketones, amines, amides, nitriles, alkoxysilanes and ethers.

Alkoxysilanes for use in the present technology include those of the general formula $(R_7)_a(R_8)_bSi(OR_9)_c$, where a and b are integers from 0 to 2, c is an integer from 1 to 4 and the sum (a+b+c) is 4; $R_7$, $R_8$, and $R_9$, are radicals with 1-18 carbon atoms optionally containing heteroatoms. Silicon compounds in which a is 1, b is 1, c is 2, at least one of $R_7$ and $R_8$ is selected from branched alkyl, cycloalkyl or aryl groups with 3-10 carbon atoms optionally containing heteroatoms and $R_9$ is a $C_1$-$C_{10}$ alkyl group, such as methyl, may be used. Examples of silicon compounds are methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, methyl(3,3,3-trifluoro-n-propyl)dimethoxysilane and N,N-diethylaminotriethoxysilane. Moreover, silicon compounds in which a is 0, c is 3, $R_8$ is a branched alkyl or cycloalkyl group, optionally containing heteroatoms, and $R_9$ is methyl may be used including cyclohexyltrimethoxysilane, t-butyltrimethoxysilane and thexyltrimethoxysilane. Aminosilanes as disclosed in EP-A-1538167 may also be used.

Ethers for use in the present technology include alkoxybenzenes as described in WO 2011/015553, cyclic alkyl ethers such as tetrahydrofuran, 1,3-diethers such as those described in EP362705 and EP728769 and electron donor compounds of the general formula (I) below:

$$RR_1C(OR_4)-CR_2R_3(OR_5) \qquad (I)$$

where R, $R_1$, $R_2$ and $R_3$ are, independently, hydrogen or $C_1$-$C_{20}$ hydrocarbon groups which can also be condensed to form a cycle, $R_4$ and $R_5$ are $C_1$-$C_{20}$ alkyl groups, or $R_6CO$— groups where $R_6$ is a $C_1$-$C_{20}$ alkyl or aryl group, or can be joined with R and $R_3$ respectively to form a cycle; said R to $R_6$ groups possibly containing heteroatoms selected from O, Si, halogens, S, N and P.

In some embodiments, when R and $R_4$ form a cycle, $R_5$ is a $C_1$-$C_{20}$ alkyl group such as a methyl group.

In the electron donor compound of formula (I), $R_1$ to $R_3$ may be hydrogen. When $R_4$ and $R_5$ are linear, branched or cyclic alkyl groups, they may be chosen among $C_1$-$C_5$ alkyl groups such as methyl or ethyl groups, including where both groups are methyl. For $R_6CO$ groups, acetyl and benzyl groups may be used.

Electron donor compounds of formula (I) include ethylene glycol diacetate, 1,2-dimethoxypropane, 1,2-diethoxypropane, 1,2-diethoxyethane and methyl tetrahydrofurfuryl ether.

Esters for use in the present technology may be selected from monoesters of aromatic carboxylic acids including benzoates, the $C_1$-$C_{10}$ alkyl esters of benzoic acids, and monoesters of aliphatic carboxylic acids like $C_1$-$C_8$ alkyl esters of aliphatic mono carboxylic acids such as ethylacetate.

In some embodiments, $C_1$-$C_{10}$ alkyl esters of aromatic dicarboxylic acids like phthalates and $C_1$-$C_{10}$ alkyl esters of aliphatic dicarboxylic acids including malonates, succinates and glutarates may be used. Moreover, diesters of diols such as those disclosed in U.S. Pat. No. 7,388,061 and WO 2010/078494 can be employed. Esters for use in the present technology include ethylacetate, di-isobutyl phthalate, p-ethoxy-ethylbenzoaoate and diethyl 2,3-diisopropylsuccinate.

Alcohols for use in the present technology include those of the general formula $R^3OH$, in which the $R^3$ group is a $C_1$-$C_{20}$ hydrocarbon group. In some embodiments, $R^3$ is a $C_1$-$C_{10}$ alkyl group such as methanol, ethanol, isopropanol and butanol.

Amines for use in the present technology include those of the general formula $NR^4_3$, in which the $R^4$ groups, are, independently, hydrogen or a $C_1$-$C_{20}$ hydrocarbon group with the proviso that they are not contemporaneously hydrogen, such as when $R^4$ is a $C_1$-$C_{10}$ alkyl group such as diethylamine, diisopropylamine and trimethylamine.

Amides for use in the present technology include those of the general formula $R^5CONR^6_2$, in which $R^5$ and $R^6$ are, independently, hydrogen or a $C_1$-$C_{20}$ hydrocarbon group such as formamide and acetamide.

Nitriles for use in the present technology include those of the general formula $R^3CN$, where $R^3$ has the same meaning given above and may include acetonitrile.

Glycols for use in the present technology include those having a total number of carbon atoms lower than 50 such as 1,2- or 1,3-glycols having a total number of carbon atoms lower than 25 such as ethylene glycol, 1,2-propylene glycol and 1,3-propylene glycol.

In some embodiments, the pre-polymerization can be carried out in liquid phase, (slurry or solution) or in gas-phase at temperatures ranging from −10 to 100° C. such as from 0 to 50° C. and from 5 to 30° C. In further embodiments, the pre-polymerization may be carried out in a liquid diluent, for example in liquid hydrocarbon(s) such as pentane, hexane and heptane. The alpha olefin feeding may be kept under very mild conditions such as less than 50 g/h and less than 30 g/h. The amount of aluminum alkyl used may be less than 20 mol of Al per mol of Ti in the catalyst, including less than 10 mole and ranging from 0.2 to 2 mol of Al per mol of Ti.

The resulting prepolymerized catalyst can be used as such in a polymerization process or it can be subject to further treatments, such as when the solid catalyst component used in the prepolymerization does not contain an internal electron donor. In some embodiments, a prepolymer treatment may comprise supporting an electron donor on a prepolymer. The electron donor can be chosen from among the internal donors already described and may be carried out by contacting the prepolymer and the electron donor in a liquid hydrocarbon medium which is then removed by drying. In further embodiments, additional treatments include further reaction with titanium compounds containing at least one Ti-halogen bond, treatments with halogenating agents and treatments with aluminum alkyls.

The resulting pre-polymerized catalyst components, which may be endowed with lower settling times with respect to previously reported prepolymers, can be used in the (co)polymerization of ethylene, producing high polymer yields with regular morphology in high bulk density. In addition, the catalyst shows surprising performance in the copolymerization of ethylene with alpha-olefins, making possible to produce LLDPE polymers having a low content of xylene soluble fraction in respect to a given polymer density.

In some embodiments, ethylene (co)polymerization processes may be carried out in the presence of a catalyst comprising (A) the pre-polymerized catalyst component described above; and (B) an Al-alkyl compound as described above. In some embodiments, the main polymerization process may comprise an amount of Al that is higher than the amount of Al used in the prepolymerization step, including where the Al compound is used in an amount such that the Al/Ti ratio is higher than 1 including between 20 and 800. In further embodiments, an external electron donor compound (C) as described above can be used in the ethylene polymerization step.

The catalysts of the present disclosure can be used in any known olefin polymerization process, including slurry polymerization using as a diluent an inert hydrocarbon solvent, a bulk polymerization using the liquid monomer as a reaction medium and a polymerization process carried out in gas-phase. The gas-phase process can be carried out in a fluidized or stirred, fixed bed reactor or in a gas-phase reactor comprising two interconnected polymerization zones, one of which may be working under fast fluidization conditions and the other in which the polymer flows under the action of gravity. Also, combinations of both types of gas-phase reactors can be used. In some embodiments, the catalyst is used to polymerize ethylene in a multistep gas-phase process in which the first step is carried out in a fluidized bed gas-phase reactor and the successive step is carried out in a second a gas-phase reactor comprising two interconnected polymerization zones where one is working under fast fluidization conditions and the other under the action of gravity.

The processes and catalysts described herein can be used in a polymerization plant set-up, including a pre-polymerization section. The catalysts can, in some embodiments, be pre-polymerized in a batch scale and then used in liquid or gas-phase olefin polymerization plants operating without a pre-polymerization line.

The ethylene (co)polymerization processes described herein can be carried out in the presence of a catalyst comprising (A) a pre-polymerized catalyst component and (B) an Al-alkyl compound. In the main polymerization process the amount of Al is higher than that used in the prepolymerization process, for instance, where the Al compound is used in an amount such that the Al/Ti ratio is higher than 20 including between 50 and 800.

The polymerization processes described herein can, in certain embodiments, be carried out at temperatures of from 20 to 120° C., including from 40 to 90° C.

In any of the polymerization processes described herein (i.e., liquid- or gas-phase polymerization) the catalyst forming components (A) and (B) can be pre-contacted before adding them to the polymerization reactor. The pre-contacting step can be carried out in the absence of a polymerizable olefin or optionally in the presence of a polymerizable olefin in an amount up to 3 g per g of solid catalyst component. The catalyst forming components can be contacted with a liquid inert hydrocarbon solvent such as propane, n-hexane and n-heptane at a temperature below about 60° C., including from about 0° C. to 30° C. for a time period from 10 seconds to 60 minutes.

The processes described herein may be used for the preparation of a wide range of polyethylene products. For example, products such as high density ethylene polymers (HDPE, having a density higher than 0.940 g/cm$^3$) comprising ethylene homopolymers and copolymers of ethylene with α-olefins having 3-12 carbon atoms; linear low density polyethylenes (LLDPE, having a density lower than 0.940 g/cm$^3$) and very low density and ultra-low density (VLDPE and ULDPE, having a density lower than 0.920 g/cm$^3$, to 0.880 g/cm$^3$) consisting of copolymers of ethylene with one or more α-olefins having from 3 to 12 carbon atoms, having a mole content of units derived from the ethylene higher than 80% may be prepared.

The following examples are given in order better illustrate the technology without unduly limiting it.

EXAMPLES

Characterization

The properties are determined according to the following methods:

MIE flow index: ASTM-D 1238 condition E

Determination of Pentads (mmmm %)

The analysis was carried out on xylene insoluble fractions, where about 40 mg of polymer were dissolved in 0.5 ml of 1,1,2,2-tetrachloroethane-d2. $^{13}$C-NMR spectra were acquired at 120° C. on a Bruker AV-600 spectrometer equipped with cryoprobe operating at 150.91 MHz in Fourier transform mode. A 90° pulse with 15 seconds of delay between pulses and Composite Pulse Decoupling (CPD, bi_WALTZ_65_64pl sequence) to remove $^1$H-$^{13}$C coupling were used. About 512 transients were stored in 64K data points with a spectral window of 9000 Hz. The peak of mmmm pentad in the methyl region at 21.80 ppm was used as an internal reference. The tacticity of the polypropylene (PP) prepolymer was evaluated from integrals of pentads in the PP methyl region using the microstructure analysis described in "*Studies of the stereospecific polymerization mechanism of propylene by a modified Ziegler-Natta catalyst based on 125 MHz 13C n.m.r. spectra*" Y. Inoue, Y. Itabashi, R. Chûjô *Polymer*, 1984, 25, 1640; and "*Two-site model analysis of 13C n.m.r. of polypropylene polymerized by Ziegler-Natta catalyst with external alkoxysilane donors*" R. Chûjô Y. Kogure, T. Väänänen *Polymer*, 1994, 35, 339. In case of overlapping signals, the chain ends were subtracted. The experimental pentad distribution was fitted using the two-site model described in the second reference (*Polymer*, 1994). The total mmmm pentad obtained from the fitting is reported.

Intrinsic Viscosity:

Determined in tetrahydronaphthalene at 135° C. After dissolving the sample in tetrahydronaphthalene at 135° C., the solution is poured into the capillary viscometer. The viscometer tube (Ubbelohde type) is surrounded by a cylindrical glass jacket; this setup allows temperature control with a circulating thermostated liquid. The passage of the meniscus in front of the upper lamp starts the counter, which has a quartz crystal oscillator. The meniscus stops the counter as it passes the lower lamp and the efflux time is registered: this time is converted into a value of intrinsic viscosity through Huggins' equation, knowing the flow time of the pure solvent at the same experimental conditions (same viscometer and same temperature). One single polymer solution is used to determine[η].

General Procedure for the Standard Propylene Polymerization Test

A 4 liter steel autoclave equipped with a stirrer, pressure gauge, thermometer, catalyst feeding system, monomer feeding lines and thermostating jacket was used. The reactor was charged with 0.01 g of solid catalyst component and with 6.6 mmols of TEAL, with 1.6 kg of propylene and 1.5 NL of hydrogen were added. The system was heated to 70° C. over 10 min under stirring and maintained under those conditions for 120 min. At the end of the polymerization, the polymer was recovered by removing any non-reacted monomers and dried under vacuum.

2.5 g of the resulting polymer and 250 ml of o-xylene were placed in a round-bottomed flask provided with a cooler and a reflux condenser and kept under nitrogen. The resulting mixture was heated to 135° C. and kept under stirring for about 60 minutes. The final solution was allowed to cool to 0° C. under continuous stirring and the insoluble polymer was filtered at 0° C. The filtrate was then evaporated in a nitrogen flow at 140° C. to reach a constant weight. The content of the xylene-soluble fraction is expressed as a percentage of the original 2.5 grams and then, by difference, the xylene-insoluble fraction (X.I.%).

General Slurry Procedure for Ethylene Polymerization (HDPE)

Into a 4 liter stainless steel autoclave, 1600 cc of anhydrous hexane degassed under $N_2$ stream at 70° C., 0.025 g of spherical component and 0.5 g of triethylaluminum (TEA) were introduced. The mixture was stirred, heated to 75° C. and 4 bar of $H_2$ and 7 bar of ethylene were fed into the autoclave. The polymerization lasted 2 hours, during which ethylene was fed to keep the pressure constant.

General Procedure for Gas-Phase Ethylene Polymerization (HDPE)

A 15.0 liter stainless-steel fluidized reactor equipped with gas-circulation system, cyclone separator, thermal exchanger, temperature, pressure indicator, feeding line for ethylene, propane, hydrogen, and a 1 L steel reactor for the catalyst pre-polymerization and/or injection of the catalytic system into the fluidized bed reactor were used.

The gas-phase apparatus was purified by fluxing pure nitrogen at 40° C. for 12 hours and then circulated with a propane (10 bar, partial pressure) mixture containing 0.2 g of triisobutylaluminum (TIBA) at 80° C. for 30 minutes. The mixture was depressurized and the reactor washed with pure propane, heated to 80° C. and finally loaded with propane (60 mol %), ethylene (10 mol %) and hydrogen (30 mol %) having 24 bar of total pressure.

In a 100 mL three neck glass flask were introduced (in the following order) 20 mL of anhydrous heptane, 1.1 g of TIBA, 0.16 g of diethylchloroaluminum (DEAC), 0.014 g of tetrahydrofuran (THF) and 0.22 g of the catalyst component. The compounds were mixed together and stirred at room temperature for 5 minutes, introduced in the 1 L reactor with 100 g of propane and kept at 50° C. for 1.5 hours before the introduction of the catalytic system into the fluidized bed reactor where the polymerization starts. The polymerization test lasts 2 hours.

Example 1

Procedure for the Preparation of the Spherical Support (Adduct of $MgCl_2$/EtOH)

A magnesium chloride and alcohol adduct was prepared following the method described in Example 2 of U.S. Pat. No. 4,399,054, but working at 2000 RPM instead of 10000 RPM. The adduct containing about 3 mols of alcohol and about 2.5 wt % of $H_2O$, and had an average size of about 55 μm. The adduct was subjected to a thermal treatment, under a nitrogen stream, over a temperature range of 50-150° C. until a weight content of 25% alcohol was reached.

Procedure for the Preparation of the Non-Stereospecific Catalyst Component

Into a 2 L reaction vessel, purged with nitrogen, 1 L of $TiCl_4$ was introduced at 0° C. At the same temperature, 70 grams of a spherical $MgCl_2$/EtOH adduct containing 25 wt % of ethanol, prepared as described above, were added under stirring.

The temperature was raised to 130° C. in 2 hours and maintained for 60 min. The stirring was discontinued, the solid product was allowed to settle for 1 hour at 130° C. and the supernatant liquid was siphoned off. A volume of fresh $TiCl_4$ was introduced into the reactor in order to have 1 L of total slurry and the temperature was raised to 110° C. under stirring. This temperature was kept for 15 min, the stirring was stopped, the solid was allowed to settle for 1 hour at 110° C. and the supernatant liquid was siphoned off.

The solid residue was then washed two times with hexane at 50° C. and three times at 25° C. and dried under vacuum at 30° C. and analyzed.

The spherically shaped solid has a magnesium content of 19.0 wt % and an average particle size (P50) of 57 microns.

The intermediate solid component was tested in a propylene polymerization using the general method described above. The resulting polymer had a xylene insoluble fraction of 48.1 wt %.

Propylene (Pre-Polymerization)

Into a 1.5 L glass reactor provided with a stirrer, 0.8 L of hexane at 20° C. and 47 g of the catalyst component prepared as described above were introduced at 10° C. Under constant temperature, 14 g of tri-n-octylaluminum (TnOA) in hexane (about 370 g/l) were slowly introduced into the reactor and the temperature was kept at 10° C. After 3 minutes of stirring, a fixed amount of an external electron donor compound (C) was introduced into the reactor as indicated in Table 1. After 10 min, 61 g of propylene were carefully introduced into the reactor at the same temperature over 6 hours, keeping a constant flow. The consumption of propylene in the reactor was monitored and the polymerization was discontinued when a theoretical conversion of 1.3 g of polymer per g of catalyst was reached. The prepolymer particles were allowed to settle and the sedimentation rate was measured (Table 1). The product was washed four times with hexane at a temperature of 20° C. (60 g/L) and dried under vacuum at 30° C. The prepolymerized catalysts were analyzed in terms of stereoregularity (% mmmm) and average molecular weight (intrinsic viscosity). The data are reported in Table 1.

Internal Electron Donor Supportation on the Prepolymerized Catalyst

About 42 g of the solid prepolymerized catalyst prepared as described in the previous example were charged in a glass reactor purged with nitrogen and slurried with 0.8 L of hexane at 50° C.

Ethyl acetate was carefully added dropwise over 10 min in such an amount as to have a molar ratio of 1.7 between Mg of the prepolymerized catalyst and the organic Lewis base.

The slurry was kept under stirring for 2 h at 50° C.

The stirring was stopped and the solid was allowed to settle. One hexane wash was performed at room temperature before recovering and drying the final catalyst.

The final solid composition is shown in Table 1.

The pre-polymerized solid catalyst component was employed in the ethylene polymerization according to both slurry and gas phase procedure the results of which are reported in Table 2 and 3, respectively.

Comparative Example 2

The catalyst was prepared according to the procedure described in Example 1 but the prepolymerization process was carried out without the addition of any external electron donor compound. The catalyst composition and characterization is reported in Table 1. The pre-polymerized solid catalyst component was employed in ethylene polymerization according to both slurry and gas phase procedures, the results of which are reported in Tables 2 and 3, respectively.

TABLE 1

List of Electron donor type and relative amount used in pre-polymerization (with respect to the TnOA) and catalyst composition obtained thereafter.

| Cat. Ex. | Electron Donor (C) (type) | TnOA/(C) (mol/mol) | % mmmm | IV dL/g | Sed. Rate mm/sec | Ti (wt %) | Mg (wt %) | EtOAc (wt %) |
|---|---|---|---|---|---|---|---|---|
| 1-a | Cyclohexylmethyl-dimethoxysilane | 50 | 76 | 1.0 | 0.29 | 1.6 | 9.0 | 14.8 |
| 1-b | Cyclohexylmethyl-dimethoxysilane | 12 | 73 | 1.5 | 0.42 | 1.4 | 8.5 | 13.9 |
| 1-c | Cyclohexylmethyl-dimethoxysilane | 6 | 81 | 1.9 | 0.36 | 1.4 | 8.3 | 13.8 |
| 1-d | Cyclohexylmethyl-dimethoxysilane | 3 | 83 | 2.1 | 0.38 | 1.4 | 8.2 | 12.6 |
| 1-e | P-ethoxy ethyl benzoate | 6 | 73 | 1.5 | 0.36 | 1.4 | 8.1 | 12.2 |
| 1-f | 3.3.3-fluoropropyl-methyldimethoxysilane | 6 | 74 | 1.9 | 0.34 | 1.5 | 8.6 | 12.7 |
| 1-g | 1,2-dimethoxypropane | 6 | 66 | 2.4 | ND | 1.4 | 8.2 | 13.5 |
| Comp. ex. 2 | absent | — | 72 | 0.9 | 0.24 | 1.8 | 9.8 | 16.8 |

TABLE 2

Hexane slurry HDPE polymerization tests made according to the general procedure

| Cat. Example # | Electron Donor (type) | Mil. Kg/g | MIE (g/10') | F/E | BDP (g/cc) | P50 (micron) |
|---|---|---|---|---|---|---|
| 1-a | Cyclohexylmethyldimethoxysilane | 8.8 | 2.90 | 37.9 | 0.227 | 2253 |
| 1-b | Cyclohexylmethyldimethoxysilane | 9.0 | 1.00 | 33.0 | 0.263 | 2298 |
| 1-c | Cyclohexylmethyldimethoxysilane | 8.8 | 1.40 | 31.4 | 0.276 | 2203 |
| 1-d | Cyclohexylmethyldimethoxysilane | 8.7 | 1.25 | 30.4 | 0.277 | 2246 |
| 1-e | P-ethoxy ethyl benzoate | 8.9 | 1.24 | 30.6 | 0.246 | 2390 |
| 1-f | 3.3.3-fluoropropyl methyl dimethoxysilane | 8.7 | 1.32 | 34.8 | 0.276 | 2343 |
| 1-g | 1,2-dimethoxypropane | 10.5 | 1.10 | 29.1 | 0.220 | 2246 |
| Com. ex. 2 | absent | 7.6 | 0.89 | 30.7 | 0.208 | 2196 |

TABLE 3

Gas phase polymerization HDPE tests made according to the general procedure

| Cat. Example | Prepoly | Mil. g/g | MIE (g/10') | BDP (g/cc) | P50 (micron) |
|---|---|---|---|---|---|
| 1-a | Cyclohexylmethyl-dimethoxysilane | 2230 | 64 | 0.272 | 1127 |
| 1-b | Cyclohexylmethyl-dimethoxysilane | 1505 | 81 | 0.345 | 1072 |
| 1-c | Cyclohexylmethyl-dimethoxysilane | 1952 | 73 | 0.343 | 1165 |
| 1-d | Cyclohexylmethyl-dimethoxysilane | 2100 | 80 | 0.345 | 1072 |

TABLE 3-continued

Gas phase polymerization HDPE tests made according to the general procedure

| Cat. Example | Prepoly | Mil. g/g | MIE (g/10') | BDP (g/cc) | P50 (micron) |
|---|---|---|---|---|---|
| 1-e | P-ethoxy ethyl benzoate | 1842 | 69 | 0.351 | 1134 |
| 1-f | 3.3.3-fluoropropyl methyl dimethoxysilane | 1910 | 93 | 0.326 | 1136 |
| 1-g | 1,2-dimethoxypropane | 1357 | 65 | 0.308 | 1103 |
| Com. ex. 2 | absent | 1900 | 60 | 0.259 | 1133 |

Example 3

The catalysts were prepared according to the procedure described in Example 1 but the prepolymerization process was carried out with the addition of the external electron donors reported in Table 4 (catalyst compositions and characterization are also included).

The pre-polymerized solid catalysts were tested using ethylene polymerization according to the slurry methodology procedure while results are reported in table 5.

TABLE 4

List of Electron donor type and relative amount used in pre-polymerization (with respect to the TnOA) and catalyst composition obtained thereafter for example 3.

| Cat. Ex. | Electron Donor (C) (type) | TnOA/(C) (mol/mol) | % mmmm | IV dL/g | Sed. Rate mm/sec | Ti (wt %) | Mg (wt %) | EtOAc (wt %) |
|---|---|---|---|---|---|---|---|---|
| 3-a | 1-(tert-butyldimethoxysilyl)-4-methylpiperidine | 6.0 | 80 | 2.4 | 0.35 | 1.3 | 8.0 | 10.3 |
| 3-b | Ethyl acetate | 6.0 | 73 | 1.7 | 0.30 | 1.5 | 8.6 | 13.6 |
| 3-c | Diethyl-2,3-diisopropyl succinate | 6.0 | 72 | 1.8 | 0.52 | 1.5 | 8.6 | 13.3 |
| 3-d | Thexyl, trimethoxysilane | 6.0 | 83 | 1.9 | 0.44 | 1.4 | 8.2 | 13.3 |
| 3-e | Di-cyclopentyl dimethoxysilane | 6.0 | 82 | 2.1 | 0.38 | 1.2 | 7.7 | 12.0 |
| 3-f | tetraethoxy silane | 6.0 | 77 | 2.1 | 0.35 | 1.2 | 7.6 | 12.3 |

TABLE 5

Hexane slurry HDPE polymerization tests made according to the general procedure with catalysts of example 3

| Cat. Example # | Electron Donor (type) | Mil. Kg/g | MIE (g/10') | F/E | BDP (g/cc) | P50 (micron) |
|---|---|---|---|---|---|---|
| 5-a | 1-(tert-butyldimethoxysilyl)-4-methylpiperidine | 3.2 | 1.44 | 31.9 | 0.365 | 644 |
| 5-b | Ethyl acetate | 6.1 | 0.8 | 34.5 | 0.242 | 1876 |
| 5-c | Diethyl-2,3-diisopropyl succinate | 6.3 | 0.37 | 32.5 | 0.230 | 1949 |
| 5-d | Thexyl, trimethoxysilane | 7.5 | 0.85 | 35.3 | 0.300 | 2065 |
| 5-e | Di-cyclopentyl dimethoxysilane | 7.7 | 1.3 | 44.0 | 0.319 | 2073 |
| 5-f | Tetraethoxy silane | 9.1 | 0.66 | 34 | 0.275 | 2096 |

Example 4

The catalysts were prepared according to the procedure described in Example 1 but the prepolymerization process was carried out with the addition of external electron donors reported in Table 6 and propylene feeding was reduced in order to have 0.66 gram of polymer per gram of starting catalyst (catalyst compositions and characterization are also included).

The pre-polymerized solid catalysts were tested in ethylene polymerization according to the slurry methodology procedure and the results are reported in Table 7.

TABLE 6

List of Electron donor type and relative amount used in pre-polymerization (with respect to the TnOA) and catalyst composition obtained thereafter for Example 4.

| Cat. Ex. | Electron Donor (C) (type) | TnOA/(C) (mol/mol) | % mmmm | IV dL/g | Sed. Rate mm/sec | Ti (wt %) | Mg (wt %) | EtOAc (wt %) |
|---|---|---|---|---|---|---|---|---|
| 4-a | Ciclohexylmethyl-dimethoxysilane | 6.0 | 76 | 1.8 | 0.75 | 1.8 | 10.5 | 17.6 |
| 4-b | di-ciclopentyl dimethoxysilane | 6.0 | 73 | 1.8 | 0.72 | 1.9 | 10.6 | 13.6 |

TABLE 7

Hexane slurry HDPE polymerization tests made according to the general procedure with catalysts of example 4

| Cat. Example # | Electron Donor (type) | Mil. Kg/g | MIE (g/10') | F/E | BDP (g/cc) | P50 (micron) |
|---|---|---|---|---|---|---|
| 4-a | Cyclohexylmethyldimethoxysilane | 10.5 | 0.63 | 27.8 | 0.264 | 2182 |
| 4-b | Di-cyclopentyl dimethoxysilane | 11.8 | 1.2 | 40.1 | 0.289 | 2251 |

What is claimed is:

1. A process for the preparation of a pre-polymerized catalyst for the (co)polymerization of ethylene comprising:
   a) reacting anhydrous $MgCl_2$ and anhydrous EtOH under an inert atmosphere to form a $MgCl_2$/EtOH adduct; and
   b) contacting an alpha-olefin $CH_2$=$CHR^1$, wherein $R^1$ is a $C_1$-$C_{12}$ hydrocarbon, (A) a non-stereospecific solid catalyst component comprising the $MgCl_2$/EtOH adduct and $TiCl_4$, wherein a reaction of the $MgCl_2$/EtOH adduct and $TiCl_4$ is performed at a molar ratio of Ti/Mg of greater than 3, and wherein an electron donor (ED) to Ti (ED/Ti) molar ratio is lower than 0.1, an aluminum alkyl (B) as a co-catalyst and an external electron donor compound (C) at a molar ratio (B)/(C) of 0.1-50 to form the pre-polymerized catalyst.

2. The process of claim 1, wherein the aluminum alkyl (B) co-catalyst and external electron donor compound (C) are present at a molar ratio (B)/(C) from 1-20.

3. The process of claim 1, wherein the aluminum alkyl (B) co-catalyst and external electron donor compound (C) are present at a molar ratio (B)/(C) from 20 to 50.

4. The process of claim 1, wherein the aluminum alkyl (B) is selected from the group consisting of triethylaluminum, triisobutylaluminum, tri-n-butylaluminum, tri-n-hexylaluminum and tri-n-octylaluminum.

5. The process of claim 1, wherein the external electron donor compound (C) is selected from the group consisting of alcohol, glycols, esters, ketones, amines, amides, nitriles, alkoxysilanes and ethers.

6. The process of claim 1, wherein the aluminum alkyl (B) co-catalyst and external electron donor compound (C) are present at a molar ratio (B)/(C) from 1-10.

7. The process of claim 1, wherein the pre-polymerized catalyst is pre-polymerized at a temperature of −10 to 100° C.

* * * * *